Figure 1:
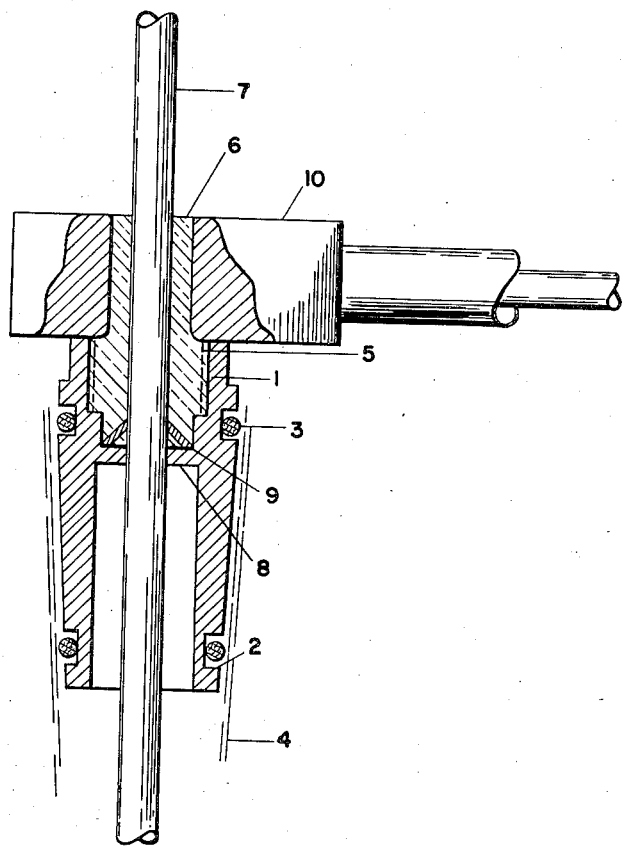

April 8, 1958     D. O. DE PREE ET AL     2,829,931
SEAL AND ADAPTER FOR LABORATORY STIRRERS
Filed Feb. 4, 1954     2 Sheets-Sheet 1

DAVID O. DE PREE
CARL A. POEHLMAN
*INVENTORS*

BY

April 8, 1958

D. O. DE PREE ET AL 2,829,931

SEAL AND ADAPTER FOR LABORATORY STIRRERS

Filed Feb. 4, 1954

2 Sheets—Sheet 2

DAVID O. DE PREE
CARL A. POEHLMAN
    INVENTORS

BY *Donald L. Johnson*

United States Patent Office 2,829,931
Patented Apr. 8, 1958

2,829,931

SEAL AND ADAPTER FOR LABORATORY STIRRERS

David O. De Pree, Royal Oak, and Carl A. Poehlman, Oak Park, Mich.

Application February 4, 1954, Serial No. 408,084

6 Claims. (Cl. 308—36.1)

The present invention relates to a combination high speed stirrer shaft seal and adapter which provides ease of attachment to vessels having a female tapered opening, such as laboratory glassware, and which also provides a gastight stirrer shaft seal at high rotational speeds. Our invention is particularly useful in providing an airtight or vacummtight seal for closed systems in the laboratory where high speed stirring is required and the chemicals employed are pyrophoric or readily damaged by exposure to air.

There are numerous instances in the chemical and other industries wherein it is necessary in the laboratory to subject a fluid or fluid mixture to a relatively high degree of agitation or stirring action. In many of these situations the presence of oxygen by air contamination cannot be tolerated, and some sort of a sealed system or inert gas flush must be provided to protect the mixture from the atmosphere. This is true, for example, in the preparation of alkyl sodium compounds (materials which are highly pyrophoric when exposed to air). In other instances, although high speed agitation is not required, a gastight seal may yet be necessary. This is true, for example, in reactions involving fusions of sodium metal.

Several types of seals are in current use in the laboratory.

The first and probably the simplest is merely the use of a glass sleeve fitted into the flask stopper and surrounding the rotating shaft. The seal is made through a small piece of rubber tubing fitted around the upper tip of the sleeve and riding on the shaft. Some sort of lubricant, such as glycerine, is applied to the shaft at point of contact to prevent abrasion of the rubber. This type of seal, though simple and effective for many reactions, has a tendency to bind under vacuum conditions, is subject to solvent attack upon the elastomer employed, and does not operate satisfactorily at rotational speeds above 1500 R. P. M.

A second useful seal for rotating shafts is the common mercury seal. This mechanism provides a positive seal and is highly satisfactory where low rotational speeds are employed and where the chemicals used do not attack the mercury. Here again, at rotational shaft speeds greater than 1500 R. P. M. the mercury is swirled, permitting leakage. Reactions, for example, involving the use of sodamide in liquid ammonia solution cannot be carried out in equipment employing this seal because of the attack of the ammonia on the mercury, forming highly explosive products. Again, if a reaction is to be run under vacuum conditions, the size of the seal required (760 mm. at 0 mm. mercury pressure) obviates its use.

It is therefore an object of our invention to overcome the disadvantages of the prior art and provide a new and improved combination stirrer shaft seal and adapter for laboratory apparatus that furnishes a positive gastight seal for vacuum application and inert gas systems for both low shaft rotational speeds (1000 R. P. M. and under) and high shaft rotational speeds (speeds up to 20,000 R. P. M.). It is also the object of our invention to provide a seal, the structure and composition of which permit its use for a wide variety of chemical reactions. It is further the object of our invention to provide ease of attachment of this seal to standard tapered laboratory glassware, providing a sealed attachment having resistance to damage to equipment from both vibrational or thermal shock. Other objects will become apparent to those skilled in the art from the following description of the invention.

Our invention may be more fully understood by reference to the accompanying drawings, in which Figure 1 is a cross sectional view of our novel combination shaft seal and adapter, and Figures 2, 3, 4, and 5 illustrate various types of seals and sleeve bearings which can be employed in our invention.

Briefly, our invention comprises a tapered adapter provided with a removable sleeve bearing through which the stirrer shaft passes. In operation the adapter with the sleeve bearing and shaft in position is inserted in the female tapered opening of a laboratory vessel or the like. The adapter is held in place in the tapered opening by the means of a plurality of resilient O rings positioned in circumferential grooves on the outer periphery of the adapter. These O rings not only securely hold the assembly in position within the opening, but also furnish a highly efficient positive fluid seal for the interior of the reaction vessel. Sealing means between the stirrer shaft and the adapter is provided by means of a resilient member positioned at the base of the sleeve bearing and adapted to be compressed by the sleeve bearing into a sealing engagement with the shaft and with the interior portion of the adapter.

Referring now to the structural details of our novel shaft seal-adapter combination as shown in Figure 1, a tapered adapter 1 is provided with a plurality of circumferential grooves 2 located on its outer periphery. O rings 3 formed of resilient material are positioned in each of the circumferential grooves 2. In order that the O rings 3 provide a positive fluid seal between the adapter 1 and the walls of the opening in which the adapter is inserted, the rings should have a cross section diameter greater than the depth of the corresponding circumferential grooves 2. For the purpose of illustrating the relative position of the adapter and the walls of the opening into which it is inserted, the dashed lines 4 indicate the general position of a female tapered opening in a reaction vessel. It can thus be seen that the O rings 3 are somewhat compressed when the assembly is inserted in position and serve not only to form a positive fluid seal but also maintain the adapter 1 out of physical contact with the walls of the opening. The actual configuration of the adapter 1 between the O rings is not critical since it is the O rings which actually set the taper. For example, instead of possessing a continuous taper between the grooves 2 as illustrated in Figure 1, the adapter may be undercut between the grooves so as to reduce its weight. Thus the term "tapered adapter" as used herein denotes an adapter in which the O rings 3, when in position, form a taper, but which need not possess an actual tapered configuration between the O rings.

The adapter 1 is also provided with a circular bore generally indicated at 5 which is adapted to receive a portion of a sleeve bearing 6 for the stirrer shaft 7. The bore 5 through the adapter is provided with an inwardly projecting shoulder 8. The shoulder 8 serves as a retaining means for a resilient shaft seal 9 positioned within the bore 5 and at the base of the sleeve bearing 6. The sleeve bearing 6 is secured in place within the bore 5 by means of a threaded engagement, although other equivalent means such as locking pins, set screws, and the like can be employed. When in position as illustrated in Figure 1, the sleeve bearing serves to compress the shaft seal 9 into sealing engagement with both the shaft 7 and the adapter 1. This feature provides a positive fluid-tight seal for the stirrer shaft which functions effectively at rotational shaft speeds even as high as 15,000 R. P. M.

A ring clamp 10, forming no part of the present invention, engages the upper portion of the sleeve bearing 6, and since this clamp 10 will be secured at its other extremity to some supporting device such as a ring stand (not shown), the clamp 10 serves to steady the entire assembly. In operation the shaft 7 is secured at its upper extremity to a source of rotatable power, such as an electric motor (not shown), and passes through the sleeve bearing and adapter into the interior of the reaction vessel (not shown).

As previously indicated, this novel combination adapter and shaft seal provides a highly efficient apparatus for use in those applications wherein high speed stirring is required for chemical reactions which must be conducted in the absence of atmospheric contamination. The novel structure also possesses the advantage of substantially eliminating the danger of breakage such as is frequently encountered when attempting to carry out high speed stirring in laboratory glassware. As explained above, the O rings 3 have a cross section diameter greater than the depth of the corresponding grooves 2 and thus retain the adapter in a spaced-apart relationship with respect to the walls of the vessel. Since the O rings maintain the adapter and walls of the opening in the spaced-apart relationship, thermal expansions are prevented from causing breakage of the glassware. Similarly, the O rings absorb much of the vibrational effect resulting from the high speed stirring and likewise prevent breakage of the female glass taper 4.

The various components of our novel apparatus can be constructed of any suitable materials, recognizing of course that the intended use involves exposure in many instances to highly corrosive atmospheres. The adapter 1, for example, may be constructed of metal such as stainless steel, glass, or any suitable hard plastic. The O rings 3 may be formed from any suitable material such as rubber, neoprene, silicone rubber, or other elastomer chemically resistant to the atmosphere to which the apparatus is to be subjected. Although the O rings have been illustrated as being generally circular in cross section, they can be rectangular or polylateral in cross section if desired. The sleeve bearing 6 should be constructed of any good bearing material, such as brass, "Oilite," or the like. The shaft seal 9 is preferably constructed of a resilient material, such as rubber, "Teflon," neoprene, nylon, or any other comparable material. It is also advantageous to impregnate the seal 9 with graphite, molybdenum sulfide, and the like to provide lubrication at the point of contact with the shaft.

Although, as illustrated in Figure 1, the shoulder 8 is positioned generally in the upper portion of the bore 5 of the adapter 1, in another form of our invention the shoulder 8 is positioned in the lower portion of the bore 5 or actually at the base of the bore 5. In such an embodiment the sleeve bearing 6 has a corresponding longer length and thus provides a longer bearing surface for the shaft 7. Such a structure has the advantage of providing a very steady support for the stirrer shaft 7 and is preferred when shaft speeds in excess of 7,000 R. P. M. are to be employed. Also, if desired, the sleeve bearing 6 can be constructed with bearing inserts, such as "Oilite" inserts, at its extremities so that throughout the major portion of its length the sleeve bearing is not in actual contact with the shaft 7, the only contact being between the shaft and the inserts. In such an embodiment the bearing inserts at the opposite ends of the sleeve bearing function as the bearing surfaces.

Figure 2:
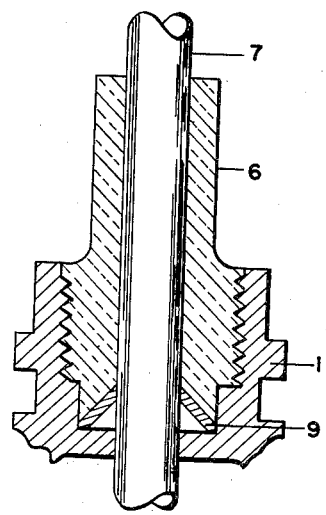
Figure 3:
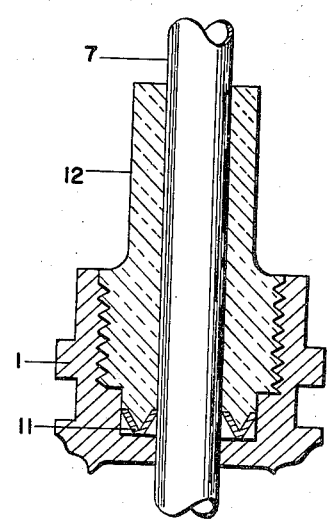
Figure 4:
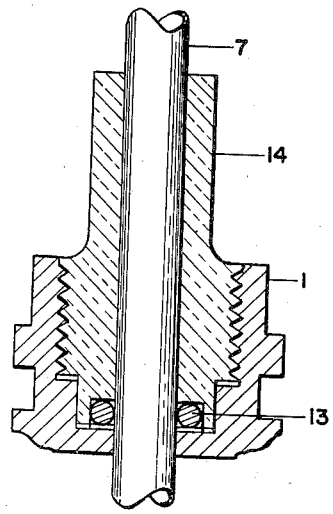

Figures 2, 3, 4, and 5 illustrate various forms of shaft seals and sleeve bearings falling within the scope of our invention. In each of these various embodiments the sleeve bearing and seal are of such configuration as to provide a minimum surface area contact between the seal and the shaft, while at the same time affording a highly efficient fluid seal. Referring to Figure 2, the seal 9 is in the form of a hollow truncated cone formed of a material such as a natural or synthetic elastomer as previously described. The configuration of the sleeve bearing 6 at its base corresponds to the configuration of the seal so that when the components are in their assembled relationship, the sleeve bearing will compress the seal 9 into sealing engagement with the shaft 7 and the adapter 1. In Figure 3 a seal member 11 is provided in the form of a ring of V-shaped cross section which may be fabricated of any of the materials previously described in conjunction with seal 9. A sleeve bearing 12 is provided with a configuration at its base so as to conform to the general configuration of the seal 11. In Figure 4 the seal 13 consists of a ring of circular cross section formed of resilient material. The lower face of the sleeve bearing 14 is flat so as to compress the seal into engagement with the shaft 7 and the adapter 1.

Figure 5:
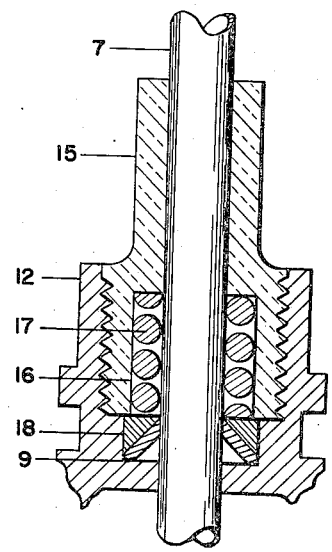

Figure 5 illustrates a somewhat more complex arrangement for the seal and sleeve bearing. In this instance the sleeve bearing 15 is undercut as indicated at 16 to provide an annular space surrounding the shaft 7 adapted to receive a compression spring 17. When assembled, the compression spring 17 bears upon the upper surface of a follower 18 in the form of a ring surrounding the shaft and having a generally triangular cross section. The follower 18 in turn bears upon a seal 9 and compresses the seal into engagement with the shaft 7 and the adapter 1. (In this instance the seal 9 is identical to that in Figures 1 and 2.) This latter arrangement, although somewhat more complex than those previously described, possesses the advantage that the wearing of the seal 9 will not destroy the fluidtight seal between the shaft and adapter since the spring 17 continually forces the seal 9 into sealing engagement.

The use of the combination shaft seal and adapter forming the subject of the present invention and its effectiveness can be most fully demonstrated by the following examples of its application.

*Example I*

A 250 ml., 3 necked, round bottom flask, having 2 necks of 19/38 standard taper and the central neck of 24/40 standard taper, was fitted with a connection from one 19/38 standard tapered neck to a mercury manometer. The second 19/38 neck was fitted with a connection to a water aspirator, and the 24/40 neck was fitted with the shaft seal and adapter illustrated in Figure 1. The stirrer shaft was constructed of 3/16" stainless steel rod and polished to a mirror surface. The sleeve bearing 6 was fabricated from "Oilite." The seal 9 was fabricated from "Teflon." The adapter 1 was constructed of stainless steel, and the circumferential O rings 3, of neoprene. The seal 9 was carefully compressed by tightening the threaded sleeve bearing 6. The adapter was pressed into the 24/40 female opening of the flask until the metal made contact with the glass. At this point pressure was released, allowing the metal to spring back so that approximately a 1/64" space separated it from the glass. A perfect seal was formed between the neoprene circumferential rings and the adapter and with the glass taper. The adapter thus locked into position requires a pulling, turning action in order to remove it from the flask.

A vacuum of 18 mm. mercury was applied to the flask by means of the water aspirator, and the vacuum source was then shut off by means of a stopcock. The stirrer shaft was rotated at over 5,000 R. P. M. by means of a high speed die grinder motor. The end of the shaft was clamped in the motor chuck and carefully aligned to prevent vibration. At 5-minute intervals the sleeve bearing was tightened slightly. A positive seal was maintained, as determined by manometer readings, for a period of 20 minutes.

*Example II*

A 250 ml., 3 necked, round bottom flask, having 2 necks of 19/38 standard taper and the central neck of 24/40 standard taper, was fitted with a connection from one 19/38 standard tapered neck to a mercury manometer. The second 19/38 tapered neck was fitted with a connection through a stopcock to a vacuum pump. The central 24/40 neck was fitted with the shaft seal-adapter combination, using the seal and sleeve bearing illustrated in Figure 3. The stirrer shaft was constructed of 3/16" stainless steel rod and polished to a mirror surface. The sleeve bearing was fabricated from "Oilite." The seal 11 was fabricated from graphite-impregnated "Teflon." The adapter was constructed of stainless steel, and the circumferential O rings, of neoprene. The seal was carefully compressed by tightening the threaded sleeve bearing. The adapter was pressed into the 24/40 female opening of the flask until the metal made contact with the glass. At this point the pressure was released, allowing the metal to spring back so that approximately a 1/64" space separated the metal from the glass. A perfect seal was formed between the neoprene circumferential O rings and the adapter and with the glass taper. The adapter was thus locked into position, requiring a pulling, turning action in order to remove it from the flask.

A vacuum of 2 mm. mercury was applied to the flask by means of the vacuum pump, and thence vacuum source was shut off by means of the stopcock. The stirrer shaft was rotated at over 5,000 R. P. M. by means of a high speed die grinder motor. The shaft was linked to the motor shaft by means of a sleeve of neoprene tubing. A positive seal was maintained, as determined by manometer readings, for a period of 45 minutes, at which time the experiment was terminated, even though no leaking had occurred.

*Example III*

A preparation of a dispersion of sodium in heavy aviation alkylate under nitrogen atmosphere was carried out employing the seal-adapter of Figure 1 in the following manner.

Twenty-three parts of metallic sodium and 1600 parts of heavy aviation alkylate were placed in a flask equipped with a nitrogen inlet, reflux condenser, and nitrogen outlet and with the stirring assembly described in Example I. The stirrer head was of a type designed for the preparation of fine dispersions. The flask was heated until the sodium became molten while nitrogen was passed through the system at a very slow rate. The stirrer was then rotated at a speed approaching 5,000 R. P. M. for a period of 10 minutes. At the conclusion of this time stirring was terminated and the flask and contents allowed to cool. A finely divided dispersion of sodium in heavy aviation alkylate remained in the flask having a shiny metallic surface free of oxide coating.

Having described our invention in detail, it can be seen that we have provided a simple and relatively inexpensive stirring shaft seal which is capable of maintaining a positive seal at high shaft rotational speeds. It is understood that the above examples are given merely to illustrate one application and two forms of our invention, and we do not intend that our invention be limited to the specific embodiments described therein, as other modifications will become apparent to those skilled in the art. We therefore intend by the appended claims to cover all modifications falling within the spirit and scope of our invention.

We claim:

1. A combination shaft seal and adapter for high speed rotatable stirrer shafts subject to varying fluid pressure during operation and adapted for use with vessels having a tapered opening, comprising in combination a tapered adapter provided with at least two circumferential grooves on its outer surface and adapted to be inserted into a tapered opening; resilient O rings positioned in each of said grooves, said adapter being provided with a circular bore therethrough; an inwardly projecting shoulder positioned within said bore; an annular sleeve bearing residing partially within said bore and adapted to receive a stirrer shaft, said sleeve bearing having an upper portion extending outside said bore; and a resilient sealing means supported upon said shoulder and compressed into sealing engagement with said shaft and said adapter when said sleeve bearing is in operative position.

2. A combination shaft seal and adapter for high speed rotatable stirrer shafts subject to varying fluid pressure during operation and adapted for use with vessels having a tapered opening, comprising in combination a tapered adapter provided with at least two circumferential grooves on its outer surface and adapted to be inserted into a tapered opening; resilient O rings positioned in each of said grooves, said adapter being provided with a circular bore therethrough; an inwardly projecting shoulder positioned within said bore; an annular sleeve bearing residing partially within said bore and having threaded engagement with the walls of said bore, said sleeve bearing adapted to receive a stirrer shaft and having an upper portion extending outside said bore; and an annular resilient sealing means supported on said shoulder and compressed by the base of said sleeve bearing into sealing engagement with said shaft and said adapter when the sleeve bearing is secured in place within said bore.

3. The apparatus of claim 2 further defined in that the base of said sleeve bearing has a configuration corresponding to the configuration of said annular resilient sealing means.

4. The apparatus of claim 3 further defined in that said annular resilient sealing means is in the form of a ring of V-shaped cross section.

5. A combination shaft seal and adapter for high speed rotatable stirrer shafts subject to varying fluid pressure during operation and adapted for use with vessels having a tapered opening, comprising in combination a tapered adapter provided with at least two circumferential grooves on its outer surface and adapted to be inserted into a tapered opening; resilient O rings positioned in each of said grooves, said adapter being provided with a circular bore therethrough; an inwardly projecting shoulder positioned within said bore; an annular sleeve bearing residing partially within said bore and having threaded engagement with the walls of said bore, said sleeve bearing adapted to receive a stirrer shaft and having an upper portion extending outside said bore; annular resilient sealing means positioned within said bore and supported upon said shoulder; and a compression spring positioned between the base of said sleeve bearing and said sealing means so as to compress said sealing means into sealing engagement with said shaft and said adapter when the sleeve bearing is secured in place within said bore.

6. The apparatus of claim 3 further defined in that said annular resilient sealing means is in the form of a hollow, truncated cone.

References Cited in the file of this patent

UNITED STATES PATENTS

| | | |
|---|---|---|
| 1,989,903 | Wheeler | Feb. 5, 1935 |
| 2,118,855 | Miller | May 31, 1938 |
| 2,404,664 | Skinner | July 23, 1946 |
| 2,481,121 | Kasten | Sept. 6, 1949 |
| 2,678,837 | Griefen | May 18, 1954 |

OTHER REFERENCES

"Cameron Catalog 48," published by Cameron Iron Works, Inc. of Houston, Texas, pages 932 and 933. Received in Patent Office Jan. 24, 1949.